United States Patent
Palma (10) Patent No.: US 9,564,843 B2
(45) Date of Patent: Feb. 7, 2017

(54) REVERSE ROTATION OF A MOTOR CONFIGURED FOR OPERATION IN A FORWARD DIRECTION

(71) Applicant: International Rectifier Corporation, El Segundo, CA (US)

(72) Inventor: Marco Palma, Castagneto Po (IT)

(73) Assignee: Infineon Technologies Americas Corp., El Segundo, CA (US)

( * ) Notice: Subject to any disclaimer, the term of this patent is extended or adjusted under 35 U.S.C. 154(b) by 97 days.

(21) Appl. No.: 13/851,812

(22) Filed: Mar. 27, 2013

(65) Prior Publication Data

US 2013/0278181 A1    Oct. 24, 2013

Related U.S. Application Data

(60) Provisional application No. 61/636,917, filed on Apr. 23, 2012.

(51) Int. Cl.
| | | |
|---|---|---|
| *H02P 1/00* | (2006.01) | |
| *H02P 6/22* | (2006.01) | |
| *H02P 23/00* | (2006.01) | |

(52) U.S. Cl.
CPC ............. *H02P 6/22* (2013.01); *H02P 23/0072* (2013.01); *H02P 23/24* (2016.02)

(58) Field of Classification Search
CPC ............... H02P 6/22; H02P 6/16; H02P 1/029; H02P 21/0032; H02P 21/145; H02P 3/22; H02P 6/008; H02P 6/142; H02P 1/26; H02P 2209/07; H02P 7/0044; H02K 11/0073; H02K 21/125; H02K 21/145; H02K 21/16

USPC .......... 318/603, 685, 452, 280, 281, 400.04, 318/400.01, 400.29, 400.11, 287, 272
See application file for complete search history.

(56) References Cited

U.S. PATENT DOCUMENTS

| | | | | |
|---|---|---|---|---|
| 4,169,990 | A | * | 10/1979 | Lerdman ................ F23N 3/082 318/400.29 |
| 4,422,029 | A | * | 12/1983 | Demers et al. ............... 318/753 |
| 4,431,954 | A | * | 2/1984 | Carpenter et al. ............ 318/443 |
| 4,438,378 | A | * | 3/1984 | Tanaka .................. H02P 7/0044 318/280 |
| 4,491,772 | A | * | 1/1985 | Bitting ...................... 318/400.04 |
| 4,494,055 | A | * | 1/1985 | Bitting et al. ............ 318/400.09 |
| 4,499,408 | A | * | 2/1985 | Bitting et al. ............ 318/400.04 |
| 4,500,821 | A | * | 2/1985 | Bitting et al. ............ 318/400.05 |
| 4,585,980 | A | * | 4/1986 | Gille et al. ..................... 318/444 |
| 4,598,240 | A | * | 7/1986 | Gale .................... B60L 11/1807 318/139 |
| 4,678,973 | A | * | 7/1987 | Elliott ................... F04D 27/004 318/272 |
| 4,706,005 | A | * | 11/1987 | Iwako .......................... 318/603 |
| 4,713,594 | A | * | 12/1987 | Bose et al. .................... 318/685 |
| 4,857,814 | A | * | 8/1989 | Duncan ........................ 318/281 |
| 4,862,053 | A | * | 8/1989 | Jordan et al. ................ 318/786 |
| 5,423,192 | A | * | 6/1995 | Young et al. ................ 62/228.4 |

(Continued)

*Primary Examiner* — Paul Ip
(74) *Attorney, Agent, or Firm* — Farjami & Farjami LLP (57) ABSTRACT

There are disclosed herein various implementations of a method and a system enabling operation of a motor in reverse. Such a method includes applying a first drive signal to begin rotating the motor in a reverse direction, the first drive signal being applied for a predetermined period of time. The method also includes using a position sensor signal for the motor to control motor drive in the reverse direction when the motor reaches a predetermined reverse speed, and operating the motor in the reverse direction.

20 Claims, 5 Drawing Sheets

(56) References Cited

U.S. PATENT DOCUMENTS

| | | | | |
|---|---|---|---|---|
| 5,442,267 A | * | 8/1995 | Harada | 318/280 |
| 5,670,852 A | * | 9/1997 | Chipperfield et al. | 318/250 |
| 5,820,349 A | * | 10/1998 | Caillat | 417/44.11 |
| 5,872,442 A | * | 2/1999 | Gotou | 318/727 |
| 5,894,204 A | * | 4/1999 | Kumita | 318/364 |
| 5,982,119 A | * | 11/1999 | Okada et al. | 318/286 |
| 6,078,152 A | * | 6/2000 | Dieterle | H02P 6/22 |
| | | | | 318/246 |
| 6,163,117 A | * | 12/2000 | Rappenecker | 318/400.04 |
| 6,271,641 B1 | * | 8/2001 | Yasohara et al. | 318/685 |
| 7,445,035 B2 | * | 11/2008 | Bruno et al. | 160/310 |
| 7,652,441 B2 | * | 1/2010 | Ying Yin Ho | H02P 1/029 |
| | | | | 318/101 |
| 7,847,498 B2 | * | 12/2010 | Shibuya | 318/400.01 |
| 8,072,166 B2 | * | 12/2011 | Takeuchi | H02K 21/16 |
| | | | | 310/179 |
| 8,704,472 B2 | * | 4/2014 | Nashiki | H02K 11/0073 |
| | | | | 310/154.26 |
| 2002/0093301 A1 | * | 7/2002 | Itami et al. | 318/452 |
| 2005/0039865 A1 | * | 2/2005 | Bruno et al. | 160/310 |
| 2006/0226802 A1 | * | 10/2006 | Marentette | 318/443 |
| 2007/0001635 A1 | * | 1/2007 | Ho | H02P 1/029 |
| | | | | 318/400.11 |
| 2007/0205731 A1 | * | 9/2007 | Beifus | 318/362 |
| 2008/0008513 A1 | * | 1/2008 | Kakishima et al. | 400/579 |
| 2008/0048598 A1 | * | 2/2008 | Shibuya | 318/400.1 |
| 2008/0197798 A1 | * | 8/2008 | Yamada | 318/696 |
| 2008/0246424 A1 | * | 10/2008 | Takeuchi | H02K 21/16 |
| | | | | 318/400.17 |
| 2010/0066781 A1 | * | 3/2010 | Niihara et al. | 347/16 |
| 2010/0259203 A1 | * | 10/2010 | Hogg et al. | 318/139 |
| 2012/0235615 A1 | * | 9/2012 | Nashiki | H02K 11/0073 |
| | | | | 318/400.28 |

\* cited by examiner

REVERSE ROTATION OF A MOTOR CONFIGURED FOR OPERATION IN A FORWARD DIRECTION

The present application claims the benefit of and priority to a pending provisional application entitled "Single Phase Motor System Reverse Rotation," Ser. No. 61/636,917 filed on Apr. 23, 2012. The disclosure in this pending provisional application is hereby incorporated fully by reference into the present application.

BACKGROUND

Background Art

Alternating current (AC) motors, such as single phase AC motors, are utilized in a wide variety of applications. For example, single phase AC motors may be used to rotate fans in large refrigeration units or freezers utilized to store and/or display perishable food products in a commercial setting. In applications requiring substantially continuous operation, high priority is typically placed on motor durability and efficiency. As a result, motors used to provide reliable temperature control for perishable goods may be configured and optimized for operation, i.e., rotation, in only one direction.

Under some circumstances, however, it may be desirable or advantageous to rotate a motor configured for operation in one direction, in reverse. For example, in commercial refrigeration applications, substantially constant rotation of a fan motor in one direction can result in the accumulation of dust or other debris on condenser coils of a refrigeration unit. Occasional reverse rotation of the fan motor may serve as an aid to purging such dust or debris from the condenser coils, resulting in more reliable and efficient cooling of the stored perishable goods.

SUMMARY

The present disclosure is directed to reverse rotation of a motor configured for operation in a forward direction, substantially as shown in and/or described in connection with at least one of the figures, and as set forth more completely in the claims.

DETAILED DESCRIPTION

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

Figure 1:
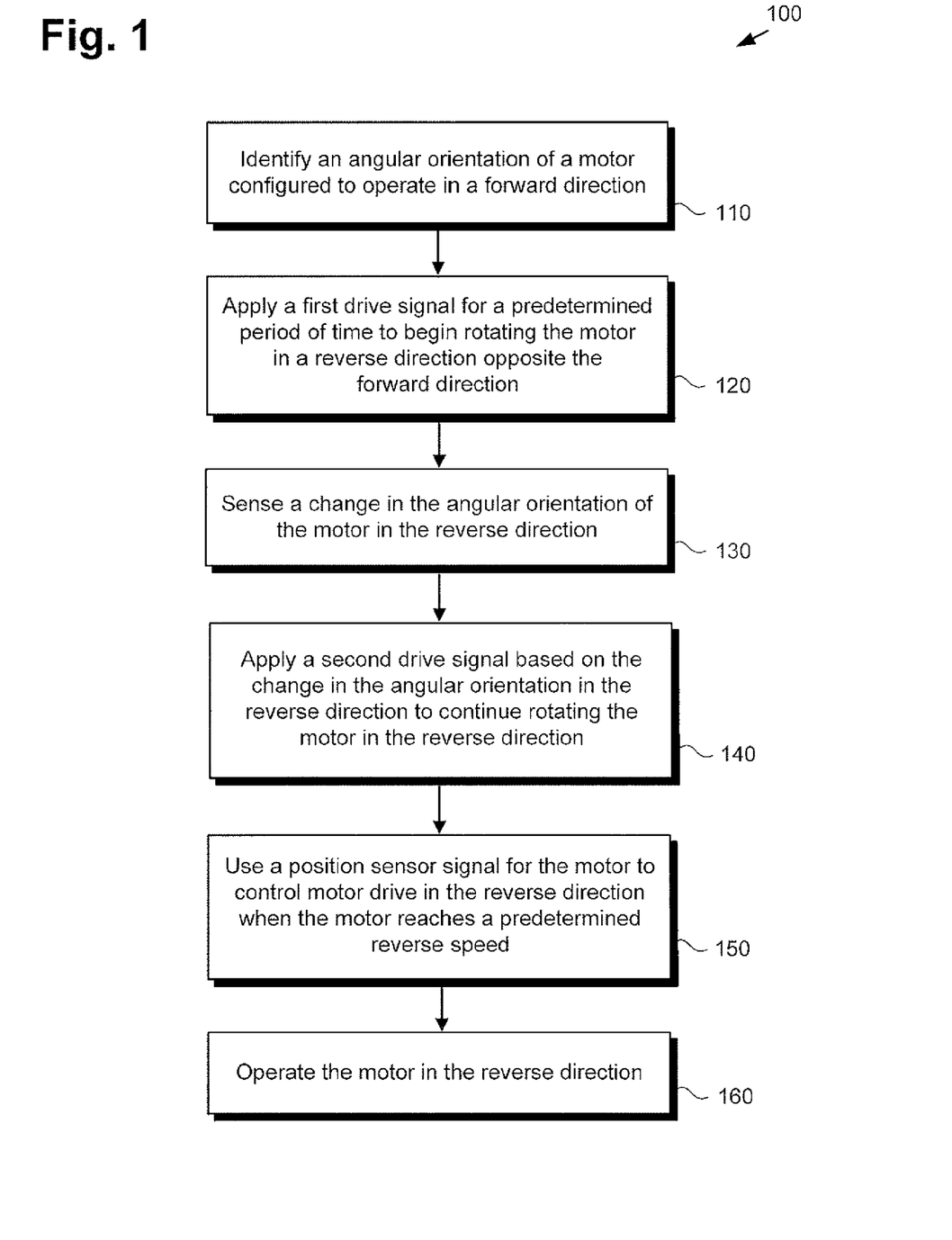
FIG. 1 shows a flowchart presenting an exemplary method enabling reverse rotation of a motor configured for operation in a forward direction, according to one implementation.

FIG. 1 shows flowchart 100 presenting an exemplary method enabling reverse rotation of a motor configured for operation in a forward direction, according to one implementation. It is noted that the method described by flowchart 100 may be utilized to enable reverse rotation of a wide variety of motor types. However, in the interests of conceptual clarity, the method of flowchart 100 will be described by reference to exemplary motor system 200, shown by FIG. 2. In addition, some of the advantages enabled by the exemplary method of flowchart 100 will be further illustrated by reference to FIGS. 3A, 3B, and 3C.

Figure 2:
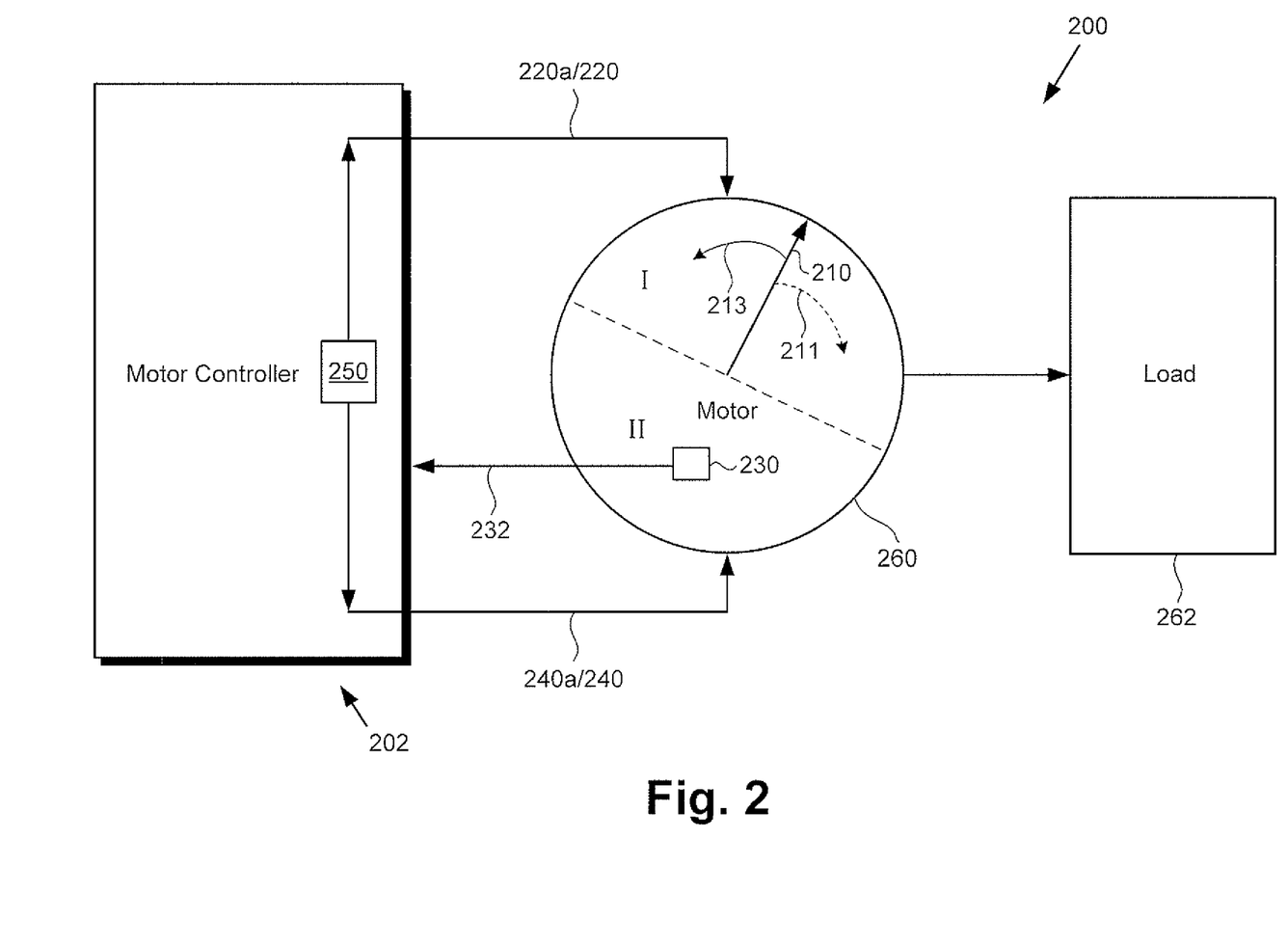
FIG. 2 shows an exemplary system enabling reverse rotation of a motor configured for operation in a forward direction, according to one implementation.

FIG. 2 shows exemplary system 200 enabling reverse rotation of motor 260 configured for operation in forward direction 211, according to one implementation. System 200 includes motor 260 coupled to load 262 so as to drive load 262. System 200 also includes motor controller 202 coupled to motor 260. As shown by FIG. 2, motor controller 202 is configured to generate motor control signal 250, as well as to provide drive signals 220a/220 and 240a/240 to motor 260, and to receive position sensor signal 232 for motor 260. Motor controller 202 may be implemented as an integrated circuit (IC), for example.

Also shown in FIG. 2 are rotor 210 of motor 260, forward direction of rotation 211 for rotor 210 (also referred to herein as "forward direction 211"), reverse direction of rotation 213 for rotor 210 (also referred to herein as "reverse direction 213"), and position sensor 230 for motor 260. It is noted that although FIG. 2 depicts position sensor 230 as being integrated with motor 260, that representation is provided merely by way of example. In other implementations, position sensor 230 may be implemented as a separate feature of system 200 and be operatively coupled to motor 260 and motor controller 202. In addition, FIG. 2 shows two exemplary angular sectors of motor 260, i.e., sectors I and II, in which rotor 210 may be positioned when motor 260 is stopped, and through which rotor 210 may rotate when motor 260 is in operation.

Figure 3A:
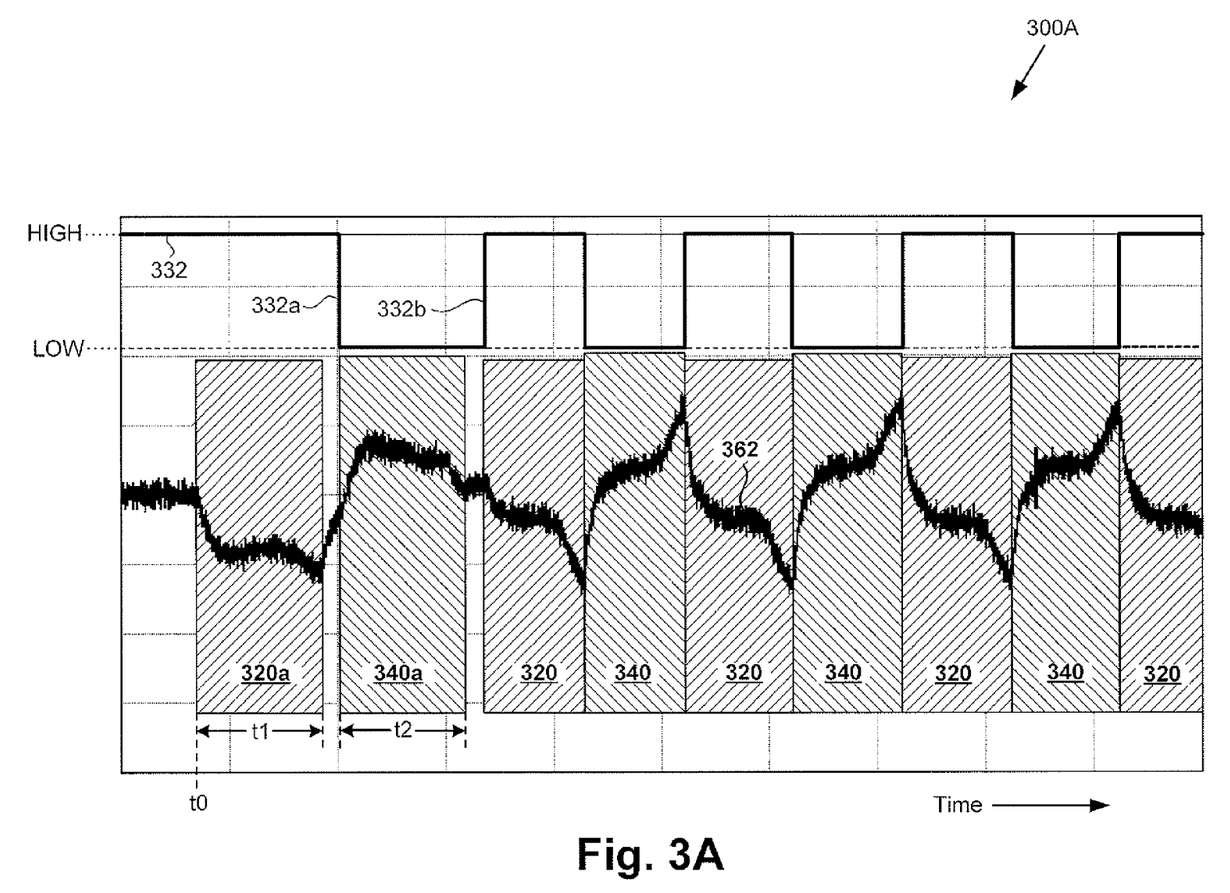
FIG. 3A shows a graph depicting an exemplary start-up of a motor in reverse, according to one implementation.
Figure 3B:
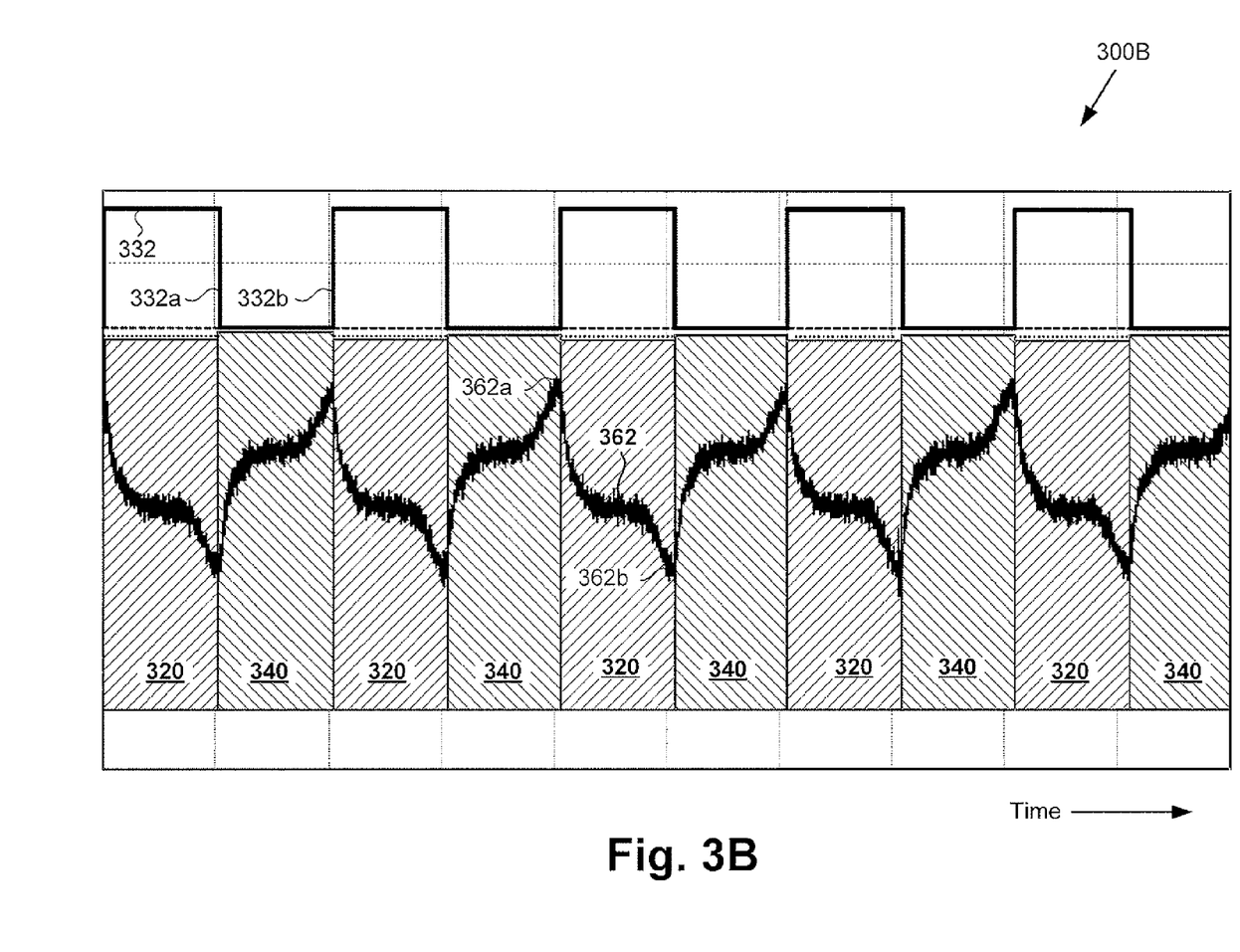
FIG. 3B shows a graph depicting an exemplary operation of a motor in reverse, according to one implementation.
Figure 3C:
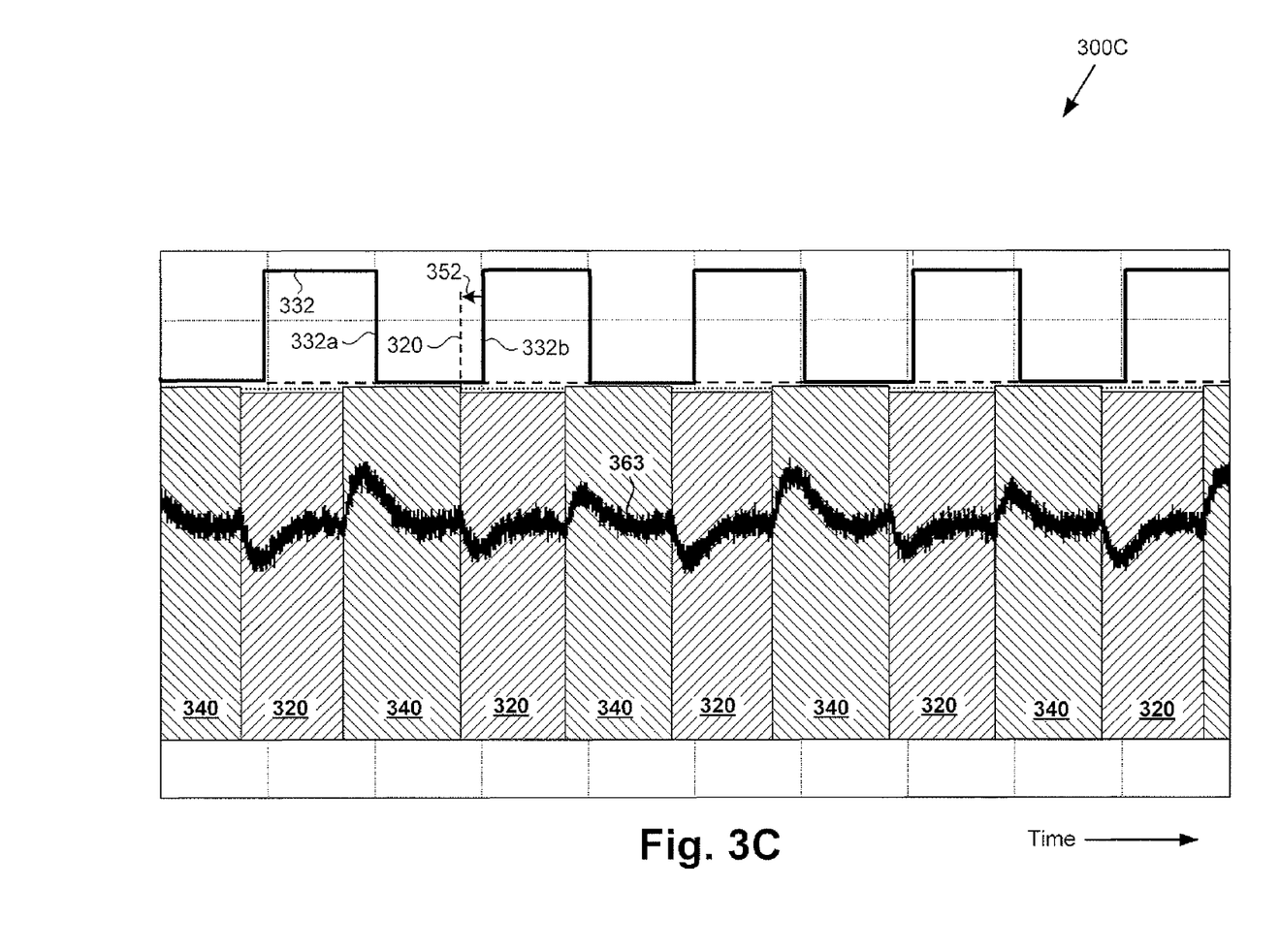
FIG. 3C shows a graph depicting an exemplary operation of a motor in reverse, according to another implementation.

Regarding FIGS. 3A and 3B, respective graphs 300A and 300B show an exemplary relationship among position sensor signal 332, the application of drive signals 320a/320 and 340a/340, and motor current 362 drawn by a motor operated in reverse, according to one implementation. FIG. 3C presents graph 300C show an exemplary relationship among position sensor signal 332, the application of drive signals 320 and 340, and motor current 363 drawn by a motor operated in reverse, according to another implementation. It is noted that drive signals 320a/320 and 340a/340, and position sensor signal 332, in FIGS. 3A, 3B, and 3C correspond respectively to drive signals 220a/220 and 240a/240, and position sensor signal 232, in FIG. 2. It is further noted that motor current 362 in FIGS. 3A and 3B, and motor current 363 in FIG. 3C, are exemplary representations of a current drawn by motor 260 to drive load 262 when motor 260 is operated in reverse direction 213, in FIG. 2.

Continuing to refer to FIGS. 2 and 3A with further reference to flowchart 100, in FIG. 1, flowchart 100 begins with identifying an angular orientation of motor 260 configured to operate in forward direction 211 (110). For example, motor 260 may be a single phase alternating current (AC) motor configured to drive load 262, which may take the form of a fan utilized in a refrigeration unit or freezer for storing and/or displaying perishable goods in a commercial setting. As noted above, in such applications, in which substantially continuous operation may be required of motor 260, high priority is typically placed on the durability and efficiency of motor 260. As a result, motor 260 may be configured and optimized for operation, i.e., rotation, in forward direction 211 opposite reverse direction 213, but not for operation in reverse direction 213. For example, motor 260 may be configured to have a reluctance facilitating startup and efficient operation in forward direction 211, while obstructing startup and resulting in substantially less efficient operation in reverse direction 213.

As further noted above, however, under some circumstances it may be desirable or advantageous to operate motor 260 in reverse direction 213. For example, in commercial refrigeration applications, substantially constant rotation of motor 260 in forward direction 211 opposite reverse direction 213 can result in the accumulation of dust or other debris on condenser coils of the refrigeration unit or freezer served by load 262. Occasional and selective operation of motor 260 in reverse direction 213 may advantageously facilitate the purging of such dust or debris from the condenser coils, resulting in more reliable and efficient cooling of the stored perishable goods.

Identification of the angular orientation of motor 260 (110) may correspond to identification of the angular position of rotor 210, such as a rest position of rotor 210 when motor 260 and rotor 210 are stopped. Identification of the angular position of rotor 210 may be performed by motor controller 202, through use of position sensor signal 232/332. Position sensor signal 232/332 may be received by motor controller 202 from position sensor 230, which may be a Hall sensor, for example, as known in the art, in which case position sensor signal 232/332 is provided as a Hall sensor signal. As shown by FIG. 3A, position sensor signal 332 may be substantially a square wave capable of having one of a HIGH or a LOW value, and including falling edges 332a and rising edges 332b corresponding to transitions from HIGH to LOW and LOW to HIGH, respectively. Referring to FIG. 2, the state of position sensor signal 232/332, i.e., HIGH or LOW may be used by motor controller 202 to identify whether rotor 210 is positioned within sector I or sector II of motor 260. According to the example implementation shown by FIGS. 2 and 3A, prior to time t0 in FIG. 3A, the angular orientation of motor 260 is such that rotor 210 is positioned in sector I, as indicated by position sensor signal 232/332 being HIGH.

Continuing to refer to FIGS. 2 and 3A in combination with FIG. 1, flowchart 100 continues with applying first drive signal 220a/320a for predetermined period of time t1 to begin rotating motor 260 in reverse direction 213 opposite forward direction 211 (120). Application of first drive signal 220a/320a may be performed by motor controller 202. In one implementation, for example, first drive signal 220a/320a may be applied as a pulse-width modulation (PWM) signal, in which the modulated drive signal is applied for predetermined period of time t1.

As noted above, motor 260 may be configured to have a reluctance which, while facilitating startup and efficient operation in forward direction 211, obstructs startup in reverse direction 213. As a result, the process utilized to startup motor 260 in forward direction 211 typically will not be effective in starting motor 260 in reverse direction 213 in which motor 260 has not been configured to operate. Consequently, the present inventive approach to enabling reverse rotation of motor 260 includes application of first drive signal 220a/320a for predetermined period of time t1 in order to overcome the reluctance of motor 260 to reverse operation. In other words, first drive signal 220a/320a may be used to apply a "kick start" to motor 260 in reverse direction 213.

It is noted that the duration of predetermined period of time t1 may vary considerably depending on the type and specifications of motor 260, as well as the characteristics of load 262. With respect to the exemplary implementation discussed above, in which motor 260 is a single phase AC motor used to rotate a fan in a refrigeration unit or freezer, first drive signal 220a/320a may be a PWM signal having a frequency of approximately ten kilohertz (10 kHz), and predetermined period of time t1 may be a period of approximately 100 milliseconds (100 ms). Moreover, first drive signal 220a/320a may be a PWM signal having a substantially constant, i.e., non-varying, duty cycle.

Application of first drive signal 220a/320a may be based on the angular orientation of motor 260 prior to time t0. For example, in implementations in which motor 260 is a single phase AC motor, drive signals may be applied to motor 260 along one of two perpendicular drive phases, for example, one of a "U phase" and a "V phase", as known in the art. Motor controller 202 may be configured to utilize the angular orientation of motor 260 identified previously to determine which of the motor phases, e.g., U phase or V phase, should receive first drive signal 220a/320a. Such a determination may be performed by motor controller 202 in order to apply the most effective driving signal for initiating rotation of rotor 210 in reverse direction 213.

Flowchart 100 continues with sensing a change in the angular orientation of motor 260 in reverse direction 213 after application of first drive signal 220a/320a (130). Sensing of the change in angular orientation of motor 260 may correspond to sensing a change in the angular position of rotor 210 in reverse direction 213, and may be performed by motor controller 202, through use of position sensor signal 232/332. As described above, according to the example implementation shown by FIGS. 2 and 3A, prior to time t0 in FIG. 3A, the angular orientation of motor 260 was such that rotor 210 was positioned in sector I, as indicated by HIGH position sensor signal 232/332.

A change in the angular orientation of motor 260 in reverse direction 213 after application of first drive signal 220a/320a may correspond to rotor 210 rotating in reverse direction 213 into sector II, which corresponds in turn to a transition in position sensor signal 232/332 from HIGH to LOW. Thus sensing of the change in angular orientation of motor 260 in reverse direction 213 may be performed by motor controller 202 through detection of falling edge 332a of position sensor signal 232/332.

Flowchart 100 continues with applying second drive signal 240a/340a based on the change in angular orientation of motor 260 to continue rotating motor 260 in reverse direction 213 (140). Application of second drive signal 240a/340a may be performed by motor controller 202. As explained above, in implementations in which motor 260 is a single phase AC motor, drive signals may be applied to motor 260 along one of two perpendicular drive phases, for example, one of a "U phase" and a "V phase". Motor controller 202 may be configured to utilize the change in angular orientation of motor 260 identified previously as a trigger to change the phase of application of the drive signal. For example, where first drive signal 220a/320a is applied to the U phase of motor 260, second drive signal 240a/340a is applied to the perpendicular V phase of motor 260 in response to falling edge 332a of position sensor signal 332.

As discussed above, motor 260 may have a reluctance that obstructs startup and operation in reverse direction 213. Consequently, the present inventive approach to enabling reverse rotation of motor 260 may include one or more additional drive signal applications, such as application of second drive signal 240a/340a in order to overcome the reluctance of motor 260 to reverse operation. In other words, second drive signal 240a/340a is used to continue the process of "kick starting" motor 260 in reverse direction 213.

Like first drive signal 220a/320a, second drive signal 240a/340a may be applied for a predetermined period of time, e.g., predetermined period of time t2. In some implementations, t1 and t2 may be substantially equal. Thus, in some implementations, first drive signal 220a/320a and second drive signal 240a/340a may be applied for predetermined period of time t1. In addition, like first drive signal 220a/320a, in some implementations, second drive signal 240a/340a may be applied as a PWM signal. Moreover, second drive signal 240a/340a may be a PWM signal having a substantially constant duty cycle.

Flowchart 100 continues with using position sensor signal 232/332 for motor 260 to control motor drive in reverse direction 213 when motor 260 reaches a predetermined reverse speed (150). Use of position sensor signal 232/332 to control motor drive in reverse direction 213 may be performed by motor controller 202.

The predetermined reverse speed at which motor controller 203 uses position sensor signal 232/332 to control motor drive in reverse direction 213 may vary considerably, based, for example, on motor 260, load 262, and the particular application for which motor 260 and load 262 are utilized. As shown by graph 300A, in FIG. 3A, according to the present implementation, motor 260 reaches such a predetermined reverse speed after application of first and second drive signals 220a/320a and 240a/340a. However, in other implementations, more, or fewer, initial drive signal applications may be required to kick start motor 260 in reverse direction 213. For example, in some implementations, second drive signal 240a/340a and/or first drive signal 220a/320a may be applied one or more additional times before motor 260 reaches the predetermined reverse speed.

As shown in FIGS. 3A and 3B, subsequent to application of respective first and second drive signals 220a/320a and 240a/340a, motor controller 202 may be configured to utilize falling edges 332a and rising edges 332b of position sensor signal 332 to trigger transitions between drive signals 320 and 340. For example, where drive signals 320 are applied to the U phase of motor 260 in response to rising edges 332b of position sensor signal 332, drive signals 340 are applied to the perpendicular V phase of motor 260 in response to falling edges 332a of position sensor signal 332. It is noted that drive signals 320 and 340 may be PWM signals having a substantially constant duty cycle.

Flowchart 100 concludes with operating motor 260 in reverse direction 213 (160). In one implementation, motor controller 202 can be configured to use position sensor signal 232/332 to generate motor control signal 250 for driving motor 260 in reverse direction 213. For example, as shown by FIGS. 3A and 3B, and as described above, motor controller 202 can generate motor control signal 250 according to the transitions of position sensor signal 232/332. However, as noted above, motor 260 is configured for operation in forward direction 211 opposite reverse direction 213. Consequently, motor 260 may perform inefficiently operated in reverse direction 213, as shown by motor current 362, which includes undesirable periodic motor current spikes 362a and 362b.

Graph 300C, in FIG. 3C, depicts operation of motor 260 in reverse direction 213, according to another implementation. FIG. 3C corresponds in general to reverse operation of motor 260 during the time interval represented in FIG. 3B. That is to say, FIG. 3C shows another implementation for operating motor 260 in reverse direction 213 (160) after startup in reverse direction 213. As shown in FIG. 3C, the transitioning between application of drive signals 320 and 340 produced by motor control signal 250 does not coincide with falling edges 332a and rising edges 332b of position sensor signal 332. As further shown in FIG. 3C, the transitions between drive signals 320 and 340 produced by motor control signal 250 are phase shifted by some amount 352 from rising edge 332b (and falling edge 332a) of position sensor signal 332. It is reiterated that drive signals 320 and 340 may be PWM signals having a substantially constant duty cycle.

Phase shifting of position sensor signal 332 to generate motor control signal 250 may be performed by motor controller 202. The amount 352 by which the transitions between drive signals 320 and 340 are phase shifted from position sensor signal 332 will typically depend on the specifications of motor 260, which may be ascertained in advance of operating motor 260 in reverse direction 213. As a result, the amount 352 of phase shift applied by motor controller 202 to generate motor control signal 250 may be predetermined so as to reduce or substantially eliminate motor current spikes 362a and 362b, in FIG. 3B. Consequently, the implementation shown in FIG. 3C enables motor 260 to have improved efficiency motor current 363 when operated in reverse direction 213. In other words, in one implementation, using position sensor signal 232/332 to control motor drive in reverse direction 213 (150) includes phase shifting position sensor signal 232/332 to generate motor control signal 250 for driving motor 260 in reverse direction 213.

Thus, by applying a first drive signal for a predetermined period of time, the implementations disclosed in the present application provide a kick start for startup in reverse of a motor configured for operation in a forward direction. In addition, by using a position sensor signal of the motor to generate a motor control signal for driving the motor in reverse, the implementations disclosed herein enable operation of the motor in reverse. Moreover, by phase shifting the position sensor signal to generate the motor control signal, the present application discloses a solution enabling enhanced efficiency by the motor when operated in reverse.

From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

The invention claimed is:

1. In a motor initially configured to have a reluctance facilitating startup and efficient operation in a forward direction, while obstructing startup and resulting in substantially less efficient operation in a reverse direction, a method for use by a motor controller, said method comprising:

identifying an angular orientation of said motor;

applying a first drive signal to begin rotating said motor in said reverse direction, said first drive signal being applied for a predetermined period of time;

sensing a change in said angular orientation of said motor in said reverse direction;

applying a second drive signal to continue rotating said motor in said reverse direction based on said change in said angular orientation;

using a position sensor signal for said motor to control motor drive in said reverse direction when said motor reaches a predetermined reverse speed;

operating said motor in said reverse direction.

2. The method of claim 1, wherein applying said first drive signal is based on said angular orientation.

3. The method of claim 1, wherein sensing said change in said angular orientation occurs after applying said first drive signal.

4. The method of claim 1, wherein said second drive signal is applied for said predetermined period of time.

5. The method of claim 1, wherein said motor is a single phase alternating current (AC) motor.

6. The method of claim 1, wherein using said position sensor signal to control motor drive in said reverse direction comprises phase shifting said position sensor signal to generate a motor control signal for driving said motor in said reverse direction.

7. The method of claim 6, wherein said position sensor signal is phase shifted relative to said motor control signal.

8. The method of claim 6, wherein said phase shifting reduces motor current spikes caused by said reluctance.

9. The method of claim 1, wherein said position sensor signal comprises a Hall sensor signal.

10. The method of claim 1, wherein drive signals used to operate said motor in said reverse direction have a substantially constant duty cycle.

11. A system comprising:

a motor initially configured to have a reluctance facilitating startup and efficient operation in a forward direction, while obstructing startup and resulting in substantially less efficient operation in a reverse direction;

a motor controller coupled to said motor, said motor controller configured to:

identify an angular orientation of said motor;

apply a first drive signal to begin rotating said motor in said reverse direction, said first drive signal being applied for a predetermined period of time;

sense a change in said angular orientation of said motor in said reverse direction;

apply a second drive signal to continue rotating said motor in said reverse direction based on said change in said angular orientation;

use a position sensor signal for said motor to control motor drive in said reverse direction when said motor reaches a predetermined reverse speed, thereby operating said motor in said reverse direction.

12. The system of claim 11, wherein said motor controller is further configured to apply said first drive signal based on said angular orientation.

13. The system of claim 11, wherein said motor controller is further configured to sense said change in said angular orientation after application of said first drive signal.

14. The system of claim 11, wherein said second drive signal is applied for said predetermined period of time.

15. The system of claim 11, wherein said motor is a single phase alternating current (AC) motor.

16. The system of claim 11, wherein said motor controller is implemented as an integrated circuit (IC).

17. The system of claim 11, wherein said motor controller is further configured to phase shift said position sensor signal, thereby generating a motor control signal for controlling said motor drive in said reverse direction.

18. The system of claim 17, wherein said position sensor signal is phase shifted relative to said motor control signal.

19. The system of claim 17, wherein said phase shift reduces motor current spikes caused by said reluctance.

20. The system of claim 11, wherein drive signals used to operate said motor in said reverse direction have a substantially constant duty cycle.

* * * * *